_United States Patent Office_

3,597,376
Patented Aug. 3, 1971

3,597,376
ALCOHOL SOLUBLE POLYAMIDE RESINS AND METHOD OF PREPARING THE SAME
Hiroji Tashiro, Tokyo, Japan, assignor to Ajinomoto Co., Inc., and Toka Shikiso Chemical Industry Co., Ltd., both of Tokyo, Japan
No Drawing. Continuation-in-part of application Ser. No. 636,594, May 6, 1967. This application Mar. 4, 1968, Ser. No. 709,938
Claims priority, application Japan, May 16, 1966, 41/30,666
Int. Cl. C08g 20/26
U.S. Cl. 260—18N          11 Claims

ABSTRACT OF THE DISCLOSURE

Polyamide resins soluble in lower alkanols and having relatively high softening points are obtained by condensing a dimerized fatty acid, a diamine and a spiroacetal dicarboxylic acid or its alkyl ester in the presence of a molecular-weight controlling agent. The resins are good binders for printing inks.

REFERENCE TO RELATED APPLICATION

This application is a continuation-in-part of the copending application Ser. No. 636,594, filed on May 6, 1967, now abandoned.

BACKGROUND OF THE INVENTION

This invention relates to polyamide resins, and particularly to polyamide resins soluble in lower alkanols and suitable as binders for flexographic and gravure printing inks.

Binder resins for inks have been prepared heretofore by condensing a dimerized fatty acid largely consisting of dicarboxylic acids having 36 carbon atoms with an alkylene diamine in the presence of a saturated or unsaturated fatty acid having 8 to 22 carbon atoms, and serving as a molecular weight controlling agent.

They have excellent adhesion to many types of plastic film and dry quickly in air. Films made from them are glossy and tough so that the known resins were used successfully in gravure printing. They are not suitable for flexographic printing on machines having rubber plates or rubber rollers and requiring printing inks whose resin binders are soluble in solvents inert to the rubber without gelling. Such solvents are practically limited to lower alkanols and their mixtures with very small amounts of aliphatic hydrocarbons or loweralkyl acetates. All polyamide resins prepared heretofore are insoluble in solvents consisting of lower alkanols only.

Moreover, the known polyamide resins employed as ink binders have softening points near 100° C., and may cause blocking on the printed surface in gravure printing because of their low temperature resistance. They are even less suitable for printing on plastic films prior to heat sealing, as is widely required in the packaging industry.

An attempt has been made to raise the softening point of the known polyamide resins by substituting dibasic acids for a portion of the dimerized fatty acid in the condensation reaction, but the higher softening point has been accompanied by reduced solubility in alcohol-bearing solvents, and solutions in such solvents tend to gel in a short time.

SUMMARY OF THE INVENTION

It has now been found that polyamide resins which are soluble in lower alkanols without tending to gel, and which have relatively high softening temperatures can be prepared by condensing a polycarboxylic polymerized fatty acid, a diamine, and a spiroacetal dicarboxylic acid or its alkyl ester of the formula

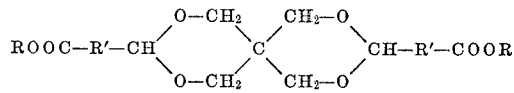

wherein R is hydrogen or alkyl having 1 to 7 carbon atoms, and R' is alkylene having a straight or branched carbon chain of 1 to 7 atoms, in the presence of a suitable molecular-weight controlling agent.

The resins obtained are polymers having recurring radicals of polycarboxylic polymers of fatty acids having approximately 18 carbon atoms, recurring radicals of diamines, and recurring radicals of spiroacetal dicarboxylic acids of the formula

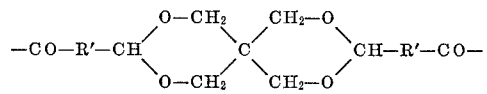

The resins form glossy, tough and flexible films, and make good binders for flexographic inks. Their softening points are between 100° C. and 150° C., and may be even higher, depending on the proportion of the spiroacetal dicarboxylic acid or ester in the polymer.

Spiroacetal dicarboxylic acids and their alkyl esters by means of which the alcohol soluble polyamide resins of the invention may be prepared include the following acids:

3,9-bis(1-carboxymethyl)-2,4,8,10-tetroxaspiro[5,5] undecane,
3,9-bis(2-carboxyethyl)-2,4,8,10-tetroxasiro[5,5] undecane,
3,9-bis(1-methyl-1-carboxyethyl)-2,4,8,10-tetroxasprio-[5,5]undecane,
3,9-bis(2-carboxypropyl)-2,4,8,10-tetroxaspiro[5,5] undecane,
3,9-bis(3-carboxypropyy)-2,4,8,10-tetroxaspiro[5,5] undecane,
3,9-bis(1,1-dimethyl-3-carboxypropyl)-2,4,8,10-tetroxaspiro[5,5]undecane,
3,9-bis(4-carboxybutyl)-2,4,8,10-tetroxaspiro[5,5] undecane,
3,9-bis(5-carboxypentyl)-2,4,8,10-tetroxaspiro[5,5] undecane,
3,9-bis(7-carboxyheptyl)-2,4,8,10-tetroxaspiro[5,5] undecane,
3,9-bis(1,1-diethylcarboxypropyl)-2,4,8,10-tetroxaspiro[5,5]undecane.

They may be replaced by their esters with alkanols having 1 to 7 carbon atoms, such as methanol, ethanol, propanol, isopropanol, n-butanol, 1-pentanol, and 1-heptanol.

The amount of spiroacetal dicarboxylic acid or of its esters that is used in the condensation mixture may be varied considerably. However, amounts of less than 0.04 equivalent, based on an acid equivalent of 1.00 for all free acids and esters present in the mixture, do not enhance the solubility of the resulting polyamide in alcohol, and more than 0.25 equivalent of the spiroacetal carboxylic acid or esters unfavorably affects the stability of the alcohol solutions of the resin produced.

Solvents other than alcohols are permissible in gravure inks, and the resins of the invention may be prepared from condensation mixtures containing more than 0.25 equivalent of spiroacetal dicarboxylic acid or ester to raise the melting point. However, resins prepared with more than 0.35 equivalent tend to be brittle.

The diamine component employed in the condensation reaction may be an aliphatic diamine, such as ethylenediamine, trimethylenediamine, tetra-, hexa-, or heptamethylenediamine; a cycloaliphatic diamine, such as 1,4- diaminomethylcyclohexane; an aromatic diamine, such as m-phenylenediamine or m-xylylenediamine; or a heterocyclic diamine, such as 3,9-bis(3-aminopropyl)-2,4,8,10-tetroxaspiro[5,5]undecane.

The polymerized fatty acid may be a dimer prepared by thermal polymerization of aliphatic acids of drying or semi-drying oils, such as soybean, linseed, cotton seed, or tall oil, as is well known. Mixtures consisting of a major part of dimer and of minor parts of monomer and trimer may be used. Such mixtures are commercially available, for example, as Empol 1014, Empol 1016, Empol 1018, and Empol 1022 (Emery Industries Inc.), and also as Versadyme 216 (General Mills Inc.). The trimer is a $C_{54}$ tribasic acid, the dimer a $C_{36}$ dibasic acid, and the dimer-trimer mole ratio is approximately 6:1 to 36:1.

The dibasic acids, such as sebacic acid, azelaic acid, glutaric acid, adipic acid, pimelic acid, suberic acid, terephthalic acid, or isophthalic acid, which were heretofore employed for raising the melting points of the known resins may be used in this invention in very small amounts which do not affect the stability of the alcoholic polyamide resin solutions.

In addition to the saturated and unsaturated fatty acids having 8 to 22 carbon atoms, which were employed heretofore for controlling the molecular weight of the condensate of a polymeric fatty acid with an alkylene diamine, suitable molecular weight controlling agents for the purpose of this invention include monobasic acids, such as salicylic acid, p-hydroxybenzoic acid, 4,4-bis(4-hydroxyphenyl)-pentanoic acid, 4,4-bis(hydroxyphenyl)-butyric acid, lactic acid, 3-methoxybutyric acid, and 3-ethoxypropionic acid; monoamines, such as 2-ethylhexylamine, 2 - methylpentylamine, oleylamine, 3 - methoxypropylamine, 2 - methoxyisopropylamine, ethoxypropylamine, 3-isopropoxypropylamine, and 3-(2-ethoxyethoxy)-propylamine; and polyamines, such as diethylenetriamine and 2-hydroxyethylethylenediamine; and alkanol amines such as ethanolamine and iso-propanol amine.

A small amount of a monoamine or of a monobasic acid which has a lower alkoxy group in its molecule, when used as a molecular weight controlling agent, tends to enhance the solubility of the resin produced and the stability of its solutions in lower alkanols.

Resins being even more soluble in alcohols are obtained from spiroacetal diacarboxylic acids and esters in combination with dibasic acids or their esters containing ether bonds and having the following formula:

$$R'-OOC-(CH_2)_m-O-R'''_n$$
$$-O-(CH_2)_m-COOR''$$

wherein $m$ is 1 or 2, $n$ is 0 or 1, $R''$ is hydrogen or alkylene having 1 to 6 carbon atoms, $R'''$ is divalent phenylene or diphenylenealkane of the formula

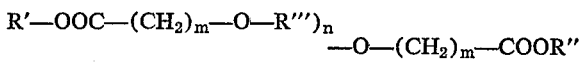

wherein X is alkyl having 1 to 4 carbon atoms. Suitable dibasic acids include diglycolic acid,
ethylenedihydroxyacetic acid,
m-phenylenedihydroxyacetic acid,
p-phenylenedihydroxyacetic acid,
m-phenylenedihydroxypropionic acid,
p-phenylenedihydroxypropionic acid,
[4-(carbomethoxy-phenyl)] methane,
1,2-bis[4-(carbomethoxy)phenyl] ethane,
1,3-bis[4-(carbomethoxy)phenyl] propane,
2,2-bis[4-carbomethoxy)phenyl] propane,
bis[4-(carbomethoxy)-phenyl] methane,
1,2-bis[4-(carboethoxy)phenyl] propane,
and 2,2-bis[4-carboethoxy)phenyl] propane.

The free spiroacetaldicarboxylic acids generally have high melting points and may not undergo condensation as readily as their low melting alkyl esters which go into homogeneous solution as the condensation reaction proceeds.

The amino groups and reactive carboxyl groups may be present in the condensation mixture in equal numbers, or one may be in excess over the other by up to 10%. Better results are usually obtained with a slight excess of amino groups.

The condensation reaction may be carried out at temperatures between 180° C. and 260° C., preferably between 210° C. and 230° C. When the desired temperature is reached, it is maintained for approximately 3 to 5 hours. An inert atmosphere is preferably maintained in the reaction zone by bubbling an inert gas, such as nitrogen, through the reaction mixture to avoid the formation of dark by-products.

DESCRIPTION OF PREFERRED EMBODIMENTS

The following examples are further illustrative of this invention, and it will be understood that the invention is not limited thereto.

EXAMPLE 1

A polyamide resin was prepared from the following components:

|  | Equivalents Total acid equivalent=1 |
|---|---|
| Empol 1018 (M.W. 564) | 0.86 |
| Oleic acid | 0.07 |
| Me-CaTU [1] | 0.07 |
| Ethylenediamine | 1.02 |

[1] Me-CaTU: 3,9 - bis(2-carbomethoxyethyl)2,4,8,10-tetroxaspiro[5,5]undecane.

A mixture of the four components was placed in a 3-neck round-bottom glass flask equipped with a thermometer, a stirrer, a side arm water trap and a condenser. The temperature was slowly raised to 220° C. in a nitrogen atmosphere and kept at that level for 4 hours while the stirrer was operating. Thereafter, the reaction mixture was allowed to cool to 180° C., and the polyamide resin formed was removed from the flask.

The polyamide resin had the following properties:

| Acid value | 2.8 |
|---|---|
| Amino value | 8.4 |
| Softening point, ° C. (ball and ring) | 118.5 |

EXAMPLE 2

| Empol 1018 | 0.74 |
|---|---|
| Oleic acid | 0.06 |
| Me-CaTU | 0.2 |
| Ethylenediamine | 1.02 |

The procedure of Example 1 was repeated with the above components. The polyamide resin obtained had the following properties:

| Acid value | 2.8 |
|---|---|
| Amine value | 8.9 |
| Softening point ° C. | 143 |

EXAMPLE 3

| Empol 1018 | 0.60 |
|---|---|
| Oleic acid | 0.05 |
| Me-CaTU | 0.35 |
| Ethylenediamine | 1.03 |

The procedure of Example 1 was repeated. The polyamide resin obtained had the following properties:

| Acid value | 2.0 |
|---|---|
| Amine value | 11.1 |
| Softening point ° C. | 154.5 |

Table 1 shows the relationship of the softening point and the Me-CaTU content of polyamide resins prepared from Empol 1018, oleic acid, Me-CaTU, and ethylenediamine, in the manner described above.

TABLE I

| Me-CaTU content: | Softening point (° C.) |
|---|---|
| 0.07 | 118.5 |
| 0.1 | 127.0 |
| 0.15 | 138.0 |
| 0.2 | 143.0 |
| 0.25 | 145.0 |
| 0.30 | 148.5 |
| 0.35 | 154.5 |
| 0.40 | 162.0 |

EXAMPLE 4

The procedure of Example 1 was repeated using 4,4-bis(4-hydroxyphenyl)pentanoic acid instead of oleic acid as the molecular-weight controlling agent.

| Empol 1018 | 0.72 |
|---|---|
| 4,4-bis(4-hydroxyphenyl)pentanoic acid | 0.08 |
| Me-CaTU | 0.2 |
| Ethylenediamine | 1.02 |

The polyamide resin obtained had the following properties:

| Acid value | 4.8 |
|---|---|
| Amine value | 4.5 |
| Softening point ° C | 118.5 |

EXAMPLE 5

Each of the polyamide resins obtained in Examples 1–4, respectively, was dissolved in 95% n-propanol to form a 30% polyamide resin solution.

Also, the polyamide resin of Example 4 was dissolved in 95% isopropanol to form a 30% polyamide resin solution.

The solutions prepared from the resins of Examples 1, 2, and 4 had not gelled after more than one month when they were discarded. The solution from the polyamide resin of Example 3 is not stable for more than five days, but a 35% solution of the same resin in a 1:1 mixture of 98% methanol and toluene did not gel at 17.8° C. for more than one month.

The polyamide resin of Examples 1, 2 and 4 are satisfactory binders for flexographic printing ink, while the polyamide resin of Example 3 is a binder for gravure printing ink.

EXAMPLE 6

The procedure of Example 1 was repeated using hexamethylenediamine in place of ethylenediamine.

| Empol 1018 | 0.645 |
|---|---|
| Oleic acid | 0.055 |
| Me-CaTU | 0.3 |
| Hexamethylenediamine | 1.02 |

The polyamide resin obtained had the following properties:

| Acid value | 2.9 |
|---|---|
| Amine value | 9.8 |
| Softening point ° C | 130 |

EXAMPLE 7

The reaction procedure of Example 1 was repeated using 3-methoxypropylamine in place of oleic acid as the molecular-weight controlling agent.

| Empol 1018 | 1.7 |
|---|---|
| Me-CaTU | 0.3 |
| 3-methoxypropylamine | 0.37 |
| Ethylenediamine | 1.68 |

The polyamide resin obtained had the following properties:

| Acid value | 6.4 |
|---|---|
| Amine value | 1.5 |
| Softening point ° C | 130.5 |

The resin completely dissolved in absolute ethanol and isopropanol.

EXAMPLE 8

A polyamide resin was prepared from the following components:

| Empol 1018 | 1.57 |
|---|---|
| Me-CaTU | 0.3 |
| 3-methoxypropylamine | 0.185 |
| Methyl ester of soybean oil fatty acid | 0.18 |
| Ethylenediamine | 1.87 |

The procedure described in Example 1 was repeated. The polyamide resin obtained had the following properties:

| Acid value | 3.2 |
|---|---|
| Amine value | 2.5 |
| Softening point ° C | 131 |

The resin was completely soluble in isopropanol.

EXAMPLE 9

Each of the polyamide resins obtained in Examples 7 and 8 was dissolved in isopropanol to form a 40% solution. To 60 parts of each solution were added 40 parts titanium dioxide (Titanox RA–50) as a white pigment and 10 parts isopropanol.

Each mixture was ground in a ball mill for 16 hours and then used as a flexographic printing ink.

Various papers, aluminum foil, and films of polypropylene and cellophane were thinly coated with the white inks, which dried in a short time to form very glossy, tough and flexible films. Their adhesion to the substrates was satisfactory as determined by testing with pressure. The ink films were not marred even by violent rubbing.

EXAMPLE 10

A polyamide resin was prepared from the following components:

| Empol 1018 | 1.33 |
|---|---|
| Diglycolic acid | 0.2 |
| Me-CaTU | 0.22 |
| Ethylenediamine | 2.02 |
| Methyl ester of soybean oil fatty acid | 0.25 |

The procedure of Example 1 was repeated.

The polyamide resin obtained had an acid value of 2.6, an amine value of 7.2, and a softening point of 118° C. It was completely soluble in ethanol, isopropanol and their mixtures.

EXAMPLE 11

A polyamide resin was prepared from the following components:

| Empol 1018 | 1.27 |
|---|---|
| Diglycolic acid | 0.2 |
| Me-CaTU | 0.28 |
| Ethylenediamine | 2.02 |
| Methyl ester of soybean oil fatty acid | 0.25 |

The procedure of Example 1 was followed.

The polyamide resins obtained had an acid value of 2.6, an amine value of 6.0 and a softening point of 128° C. It was completely soluble in ethanol, isopropanol, and their mixture.

EXAMPLE 12

| Versadyme 216 | 0.64 |
|---|---|
| Oleic acid | 0.06 |
| 3,9 - bis(1 - carbomethoxyethyl) - 2,4,8,10 - tetroxaspiro[5,5]undecane | 0.30 |
| Ethylenediamine monohydrate | 1.02 |

The mixture of the above components was reacted as in Example 1. The polyamide resin obtained had the following properties:

| Acid value | 11.35 |
|---|---|
| Amine value | 9.70 |
| Softening point ° C | 100.5 |

It was completely soluble in ethanol and n-propanol.

EXAMPLE 13

| | |
|---|---|
| Versadyme 216 | 0.64 |
| Oleic acid | 0.06 |
| 3,9 - bis(2 - carbomethoxypropyl) - 2,4,8,10 - tetroxaspiro[5,5]undecane | 0.30 |
| Ethylenediamine monohydrate | 1.02 |

The mixture was reacted as in Example 1. The polyamide resin obtained had the following properties:

| | |
|---|---|
| Acid value | 2.05 |
| Amine value | 7.28 |
| Softening point °C | 104 |

The resin was completely soluble in ethanol and n-propanol.

EXAMPLE 14

| | |
|---|---|
| Versadyme 216 | 0.64 |
| Oleic acid | 0.06 |
| 3,9 - bis(1 - methyl-1-carbomethoxyethyl)-2,4,8,10-tetroxaspiro [5,5] undecane | 0.30 |
| Ethylenediamine monohydrate | 1.02 |

The polyamide resin prepared from the mixture described above, had the following properties.

| | |
|---|---|
| Acid value | 4.85 |
| Amine value | 8.59 |
| Softening point °C | 106 |

It was completely soluble in ethanol and n-propanol.

EXAMPLE 15

| | |
|---|---|
| Versadyme 216 | 0.64 |
| Oleic acid | 0.06 |
| 3,9 - bis(1-carbomethoxyethyl)-2,4,8,10-tetroxaspiro [5,5] undecane | 0.30 |
| 3,9-bis(3-aminopropyl)-2,4,8,10 - tetroxaspiro [5,5] undecane | 1.02 |

The condensation procedure described in Example 1 was repeated. The resin produced had the following properties:

| | |
|---|---|
| Acid value | 2.77 |
| Amine value | 12.61 |
| Softening point °C | 108 |

It was clearly soluble in ethanol and n-propanol.

EXAMPLE 16

| | |
|---|---|
| Versadyme 216 | 0.64 |
| Oleic acid | 0.06 |
| 3,9 - bis(1-carbomethoxyethyl)-2,4,8,10-tetroxaspiro [5,5] undecane | 0.30 |
| m-Phenylenediamine | 1.02 |

The reaction was carried out as Example 1. A polyamide resin containing aromatic nuclei was obtained, and had the following properties:

| | |
|---|---|
| Acid value | 4.15 |
| Amine value | 9.08 |
| Softening point °C | 105 |

It was completely soluble in ethanol, n-propanol, and their mixture.

EXAMPLE 17

| | |
|---|---|
| Versadyme 216 | 0.64 |
| Oleic acid | 0.06 |
| 3,9 - bis(1-carbomethoxyethyl)-2,4,8,10-tetroxaspiro [5,5] undecane | 0.30 |
| Xylilenediamine (mixture of 70% m-isomer and 30% p-isomer) | 1.02 |

The polyamide resin prepared from the components described above had the following properties:

| | |
|---|---|
| Acid value | 3.63 |
| Amine value | 10.41 |
| Softening point °C | 105 |

It was completely soluble in n-propanol.

EXAMPLE 18

A polyamide resin was prepared from the following components:

| | |
|---|---|
| Versadyme 216 | 0.64 |
| Oleic acid | 0.06 |
| 3,9 - bis(1,1-dimethyl-3-carbomethoxypropyl)-2,4,8,10-tetroxaspiro [5,5] undecane | 0.30 |
| Ethylenediamine monohydrate | 1.02 |

The resin was completely soluble in ethanol and n-propanol, melted at 106° C., and had an acid value of 1.25, and an amine value of 9.72.

EXAMPLE 19

| | |
|---|---|
| Versadyme 216 | 0.34 |
| Oleic acid | 0.06 |
| 3,9 - bis(1-carbomethoxyethyl)-2,4,8,10-tetroxaspiro [5,5] undecane | 0.60 |
| Xylilenediamine (mixture of 70% m-isomer and 30% p-isomer) | 1.02 |

From these components, a polyamide resin having the following properties was obtained:

| | |
|---|---|
| Acid value | 3.06 |
| Amine value | 9.30 |
| Softening point °C | 123 |

The resin was completely soluble in ethanol, n-propanol, and their mixture.

The diamines specifically referred to in the preceding examples may be replaced by equivalent amounts of other diamines some of which have been enumerated hereinabove, without materially changing the results achieved. The chemical nature of the diamine employed, however, is not critical as will be evident from the illustrative examples.

Similarly diglycolic acid may be replaced by other acids and esters of the formula

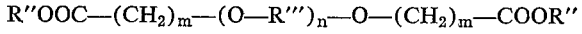

as explained and illustrated above.

It will be appreciated that acids and esters are equivalent for the purpose of this invention, and that the combined number of carboxyl and carboalkoxy groups should be approximately equal to the number of amino groups present, a slight excess of the latter being preferred. All proportions of reactants in the examples are given in equivalents of carboxy, carboalkoxy, and amino groups on the basis of the combined carboxy and carboalkoxy groups being 1.00.

All molecular-weight controlling agents employed heretofore for limiting the size of condensation polymers prepared from polymeric, and mainly dimeric, fatty acids with diamines are operative in the method of this invention, but other molecular weight limiting agents, not heretofore employed, have also been found to be effective, as shown above.

The polymeric fatty acids employed heretofore in making polyamide resin for use as ink binders, and the mixtures of acids derived from natural sources and largely consisting of dimeric acids having approximately 36 carbon atoms and two carboxyl groups, are equally useful in the reaction of this invention, and in the resins prepared thereby.

While the invention has been described with particular reference to specific embodiments, it is to be understood that it is not limited thereto, but is to be construed broadly and restricted solely by the scope of the appended claims.

What is claimed is:

1. In a polyamide resin suitable for preparing flexographic ink, the resin essentially consisting of recurring radicals of a polymerized fatty acid, said fatty acid having approximately 18 carbon atoms, and recurring radicals of a diamine, the improvement which comprises:

(a) recurring groups of a spiroacetaldicarboxylic acid radical of the formula

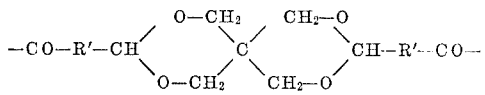

in said formula R' being alkylene having 1 to 7 carbon atoms, (b) said resin being completely soluble at 17.8° C. in ethanol, propanol, isopropanol, and mixtures thereof without gelling within five days in a concentration of 30% and having a softening point above 100° C., as determined by the ring-and-ball method, (1) the carboxy-group equivalents in said spiroacetaldicarboxylic acid radicals being 0.04 to 0.25 times the combined number of all carboxy and carbalkoxy group equivalents in said resin.

2. In a resin as set forth in claim 1, said diamine being ethylenediamine.

3. In a resin as set forth in claim 1, said radical of said formula being the radical of 3,9-bis(2-carboxyethyl)-2,4,8,10-tetroxaspiro[5,5]undecane.

4. In a method of preparing a polyamide resin suitable for flexographic ink by condensation of a mixture essentially consisting of a polymerized fatty acid, said fatty acid having approximately 18 carbon atoms, with a diamine in the presence of a small amount of a molecular weight controlling agent, the improvement which consists of:

(a) a spiroacetal dicarboxylic acid or its ester being present in said mixture and being condensed with said polymer of a fatty acid and with said diamine, said spiroacetal dicarboxylic acid or its ester being a compound of the formula

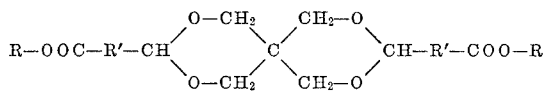

wherein R is hydrogen or alkyl having 1 to 7 carbon atoms, and R' is alkylene having 1 to 7 carbon atoms, (b) the number of carboxy and carbalkoxy groups of said compound in said mixture being between 0.04 and 0.25 times the combined number of all carboxy and carbalkoxy groups in said mixture, and the amount of said compound being sufficient to make said resin completely soluble in ethanol, propanol, isopropanol, and mixtures thereof in a concentration of 30% without gelling within 5 days while the softening point of the resin is above 100° C., as determined by the ring-and-ball method, (c) said condensation being performed at 180° to 260° C. until said resin is formed.

5. In a method as set forth in claim 4, said diamine being ethylenediamine.

6. In a method as set forth in claim 4, said compounds being 3,9 - bis(2-carbomethoxyethyl) - 2,4,8,10 - tetraoxaspiro[5,5]undecane.

7. In a method as set forth in claim 4, said molecular weight controlling agent being a monoamine or a monobasic acid, said monoamine or monobasic acid having a lower alkoxy group in the molecule thereof.

8. In a method as set forth in claim 4, a dibasic acid or an ester thereof being present in said mixture and having the formula R''—OOC—$(CH_2)_m$—$(OR''')_n$—O—$(CH_2)_n$—COOR'' wherein $m$ is 1 or 2, $n$ is 0 or 1, R'' is hydrogen or alkyl having 1 to 6 carbon atoms, and R''' is phenylene or a diphenylenealkane of the formula

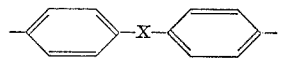

wherein X is alkyl having 1 to 4 carbon atoms.

9. In a method as set forth in claim 4, the number of the amino groups present in said mixture being approximately equal to the combined number of carboxy and carboalkoxy groups in said mixture.

10. In a method as set forth in claim 4, said polymer having approximately 36 carbon atoms and being dibasic.

11. In a method as set forth in claim 4, said polymer consisting essentially of a mixture of the dimer and the trimer in a ratio of approximately 6:1 to 36:1.

References Cited

UNITED STATES PATENTS

| | | | |
|---|---|---|---|
| 3,420,789 | 1/1969 | Wilson | 260—18 |
| 3,412,115 | 11/1968 | Floyd et al. | 260—18X |
| 3,268,461 | 8/1966 | Jacobson | 260—18 |
| 3,253,940 | 5/1966 | Floyd et al. | 260—78X |
| 3,224,893 | 12/1965 | Floyd et al. | 260—78X |
| 3,223,683 | 12/1965 | Pryde et al. | 260—78 |
| 3,161,619 | 12/1964 | Rice et al. | 260—78 |
| 2,450,940 | 10/1948 | Cowan et al. | 260—18X |
| 2,379,413 | 7/1945 | Bradley | 260—18X |

FOREIGN PATENTS

| | | | |
|---|---|---|---|
| 1,076,974 | 7/1967 | Great Britain | 260—18 |

OTHER REFERENCES

Emerez Polyamide Resins; bulletin EM–227; Emery Industries; 1965.

Bulletin 11–B–1b, Versamid Polyamide Resins for Inks; General Mills; 1960; pp. 1 to 9.

DONALD E. CZAJA, Primary Examiner

C. WARREN IVY, Assistant Examiner

U.S. Cl. X.R.

106—23, 27; 260—33.4R, 33.6R